June 17, 1969            G. E. SKORUP            3,450,890
WIDE-ENTRANCE, NARROW-EXIT THIN SHEET LIGHT GUIDE
WITH JUXTAPOSED PHOTOSENSOR
Filed July 11, 1966
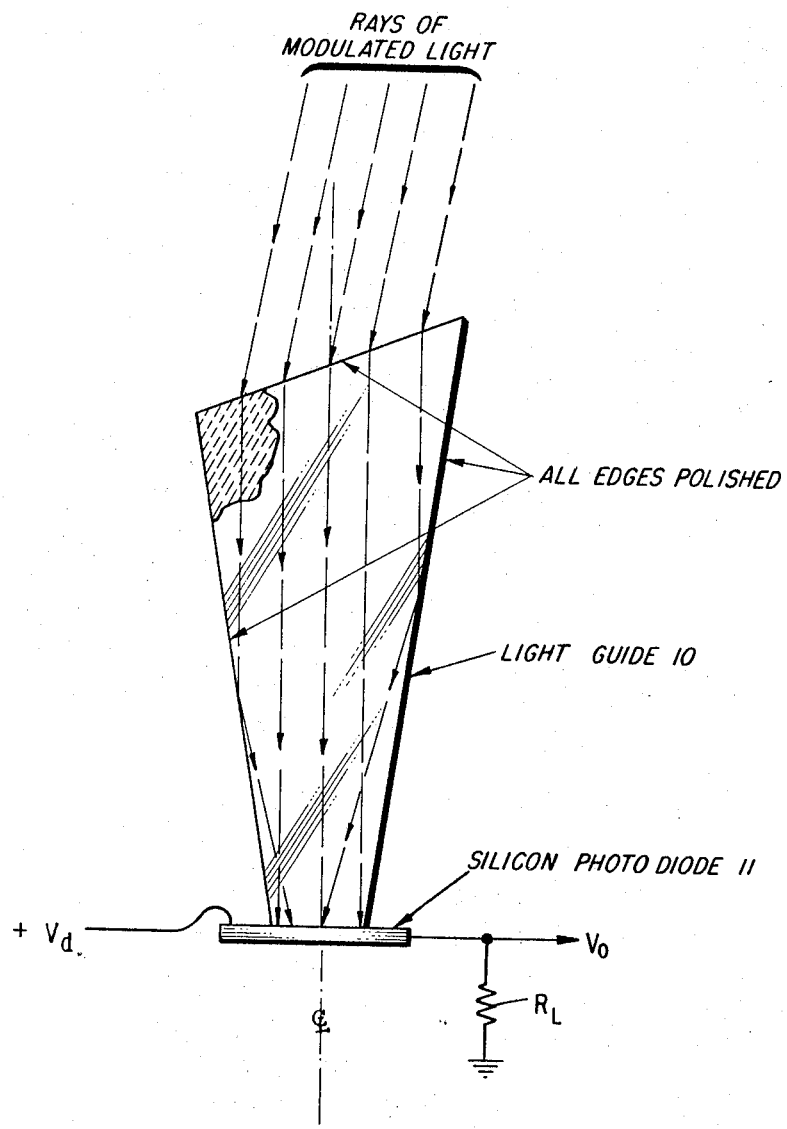
INVENTOR
GORDON E. SKORUP

United States Patent Office 3,450,890
Patented June 17, 1969

3,450,890
WIDE-ENTRANCE, NARROW-EXIT THIN SHEET LIGHT GUIDE WITH JUXTAPOSED PHOTOSENSOR
Gordon E. Skorup, Marlton, N.J., assignor, by mesne assignments, to the United States of America as represented by the Secretary of the Navy
Filed July 11, 1966, Ser. No. 564,714
Int. Cl. H01j 5/16; G02b 5/14
U.S. Cl. 250—227      4 Claims

ABSTRACT OF THE DISCLOSURE

There is disclosed a light collector-detector device comprising a thin tapered transparent glass sheet having coated sides. The light guide is coupled at its narrow end to a silicon photo diode. Light incident upon the wide entrance of the guide is guided by side to side reflections to the narrow end which corresponds in size to the silicon photo diode.

---

The present invention relates to a light collector-detector device and, more particularly, to a solid state photodetector which indicates the intensity of light that impinges on a light guide.

In the field of photodetection, it has been a general practice to employ fiber optics and multiplier phototubes to detect and collect light. Although such devices have served the purpose, they have not proved entirely satisfactory under all conditions of service for the reason that considerable difficulty has been experienced in the utilization of such devices for detecting and collecting very narrow beams of light. The use of fiber optics causes undesired signals due to discrete fiber discontinuities. In the field of detection and collection of narrow beams of light, the prior art devices have proved to be highly inefficient, overly bulky, and excessively heavy.

The general purpose of the present invention is to provide a light collector and detector which embraces most of the advantages of similarly employed prior light collectors and detectors and does not have the disadvantages of heaviness and bulkiness that are characteristic of the prior art devices. The invention has greater gain stability as a function of temperature and life and is highly advantageous in systems in which compactness is critical. In addition, it does not generate undesired signals such as the kind generated by devices using fiber optics. Furthermore, the invention is particularly useful in detection of multiple channel, narrow beam, closely spaced optical signals.

Accordingly, an object of the present invention is to provide means to collect and detect optical energy.

Another object of the present invention is to provide small lightweight efficient means to detect narrow beams of closely spaced optical energy.

Other objects, advantages and novel features of the present invention will become apparent from the following detailed description of the invention when considered in conjunction with the accompanyng drawings wherein:

The figure is an embodiment of the present invention.

Referring now to the figure, light guide 10 consists of a thin, long, tapered, narrow transparent glass or plastic sheet. The wide end of the light guide 10 is the entrance aperture and the narrow tapered end of light guide 10 is the exit aperture. The side edges of light guide 10 are polished to reflect light that enters the light guide toward the center. The exit aperture of light guide 10 is juxtaposed against a silicon photodiode 11. The photodiode 11 is reverse biased by a voltage $V_d$. Although reverse biasing is not absolutely necessary since a voltage is generated merely by the impingement of light on photodiode 11, the use of reverse biasing means affords greater detection sensitivity. The current of photodiode 11 is proportional to the intensity of light that impinges upon it while the current through photodiode 11 is obtained by measuring the voltage $V_o$ across a known resistor $R_L$.

As shown in the figure, modulated light rays incident upon the entrance aperture of light guide 10 are bent toward the centerline. Upon entering the denser glass medium, the light rays travel through the light guide and are reflected from one or more of the side walls before exiting at the tapered narrow end. Light rays that pass through the tapered narrow end of light guide 10 impinge upon photodiode 11 and thereby increase the current of the photodiode. The output signal voltage $V_o$ from photodiode 11 is proportional to the current that is conducted through photodiode 11. Hence, the output signal voltage $V_o$ indicates the intensity of the rays of modulated light that impinge on the entrance end of light guide 10. In this manner, light incident upon the long narrow entrance aperture is guided by side reflections to a short narrow exit aperture which corresponds to the size of the solid state photodiode detector.

A matrix of these devices can separately and simultaneously detect multiple light signals that are closely spaced physically and is a major improvement over previous means which use fiber optics and multiplier phototubes.

Obviously many modifications and variations of the present invention are possible in the light of the above teachings. It is therefore to be understood that within the scope of the appended claims the invention may be practiced otherwise than as specifically described.

What is claimed is:
1. A light collector and detector device comprising a light guide composed of a flat thin transparent sheet of uniform thickness having a wide entrance aperture and a narrow exit aperture and having all side edges polished to reflect light that enters the wide entrance aperture toward the narrow exit aperture; and semi-conductor means juxtaposed against said light guide exit aperture for receiving only light from said light guide and indicating the intensity of said light that enters the said entrance aperture of said light guide.
2. The invention as described in claim 1 wherein said semi-conductor means contains biasing means.
3. The invention described in claim 2 further comprising output means for determining the magnitude of light energy incident upon said thin light guide.
4. The invention described in claim 3 wherein said output means comprises a resistor.

References Cited

UNITED STATES PATENTS

| | | | |
|---|---|---|---|
| 3,119,086 | 1/1964 | Dreyfus | 250—227 |
| 2,641,713 | 6/1953 | Shire | 338—15 |
| 3,104,229 | 9/1963 | Koelmans et al. | 338—15 |
| 3,293,432 | 12/1966 | McCall et al. | 250—227 |

JAMES W. LAWRENCE, *Primary Examiner.*
V. LAFRANCHI, *Assistant Examiner.*

U.S. Cl. X.R.
338—15; 350—96